(No Model.) 2 Sheets—Sheet 1.

T. A. WESTON.
HOISTING MECHANISM.

No. 402,878. Patented May 7, 1889.

WITNESSES:
T. Nottingham Williams
Henry E. Everding.

INVENTOR
Thomas A. Weston
BY
J. H. Hindon Hyde
ATTORNEY (No Model.) 2 Sheets—Sheet 2.

T. A. WESTON.
HOISTING MECHANISM.

No. 402,878. Patented May 7, 1889.

WITNESSES:
T. Nottingham Williams
Henry E. Everding

INVENTOR
Thomas A. Weston
BY
J. E. Hindon Hyde
ATTORNEY

UNITED STATES PATENT OFFICE.

THOMAS A. WESTON, OF STAMFORD, CONNECTICUT, ASSIGNOR TO THE YALE & TOWNE MANUFACTURING COMPANY, OF SAME PLACE.

HOISTING MECHANISM.

SPECIFICATION forming part of Letters Patent No. 402,878, dated May 7, 1889.

Application filed November 26, 1887. Serial No. 256,216. (No model.)

*To all whom it may concern:*

Be it known that I, THOMAS A. WESTON, a citizen of the United States, residing at Stamford, in the county of Fairfield, State of Connecticut, have invented certain new and useful Improvements in Weston's Differential Pulleys, (shown in United States Letters Patent granted to me August 6, 1867, No. 67,470,) of which the following is a specification.

The prominent features of my invention are, first, a Weston differential pulley provided with a ratcheted driving sprocket-wheel and self-releasing ratchet-lever, whereby hoisting at two different speeds and lowering are obtained; second, a Weston's differential pulley having its differential sheaves constructed with deeply-recessed sides which cover and protect from dirt the long inwardly-projecting bearings of the frame, the said sheave and shaft being secured to each other and having a divided main frame provided with guide-arms, the object being to diminish the excessive friction of differential pulley-blocks by means of large well-protected stationary bearings which do not add to the exterior dimensions, and by the above-named general arrangement to afford compactness, a better facility for fitting together, for adjustment, and for lubrication.

Figure 1:
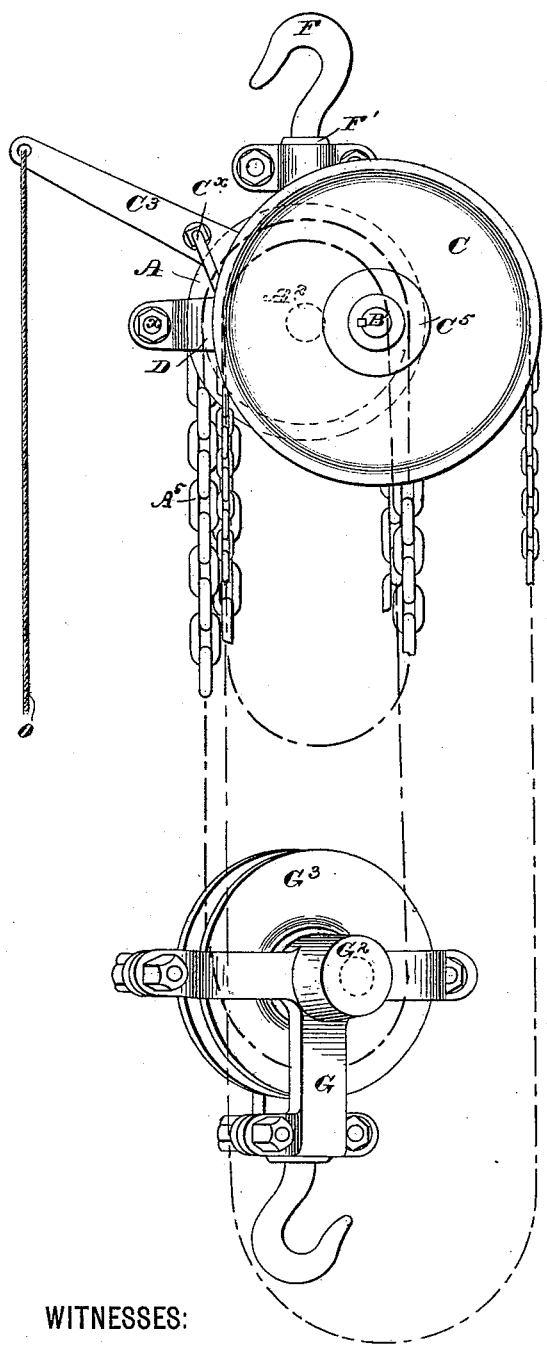
Figure 2:
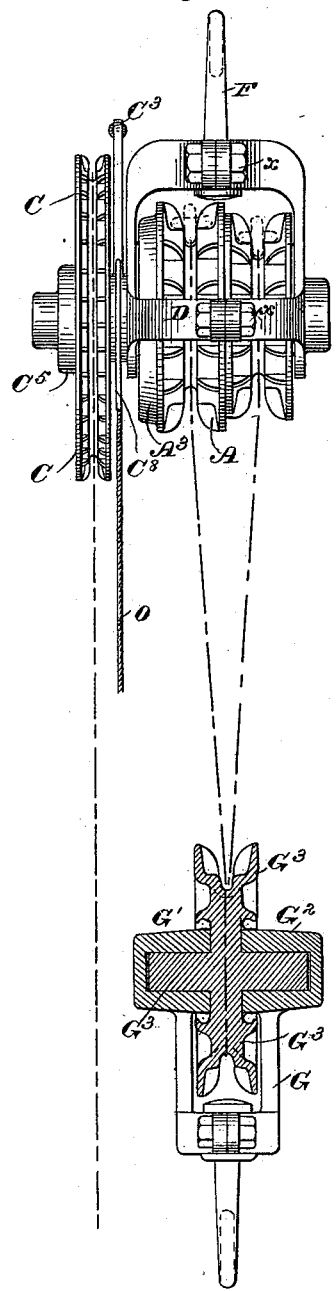
Figure 3:
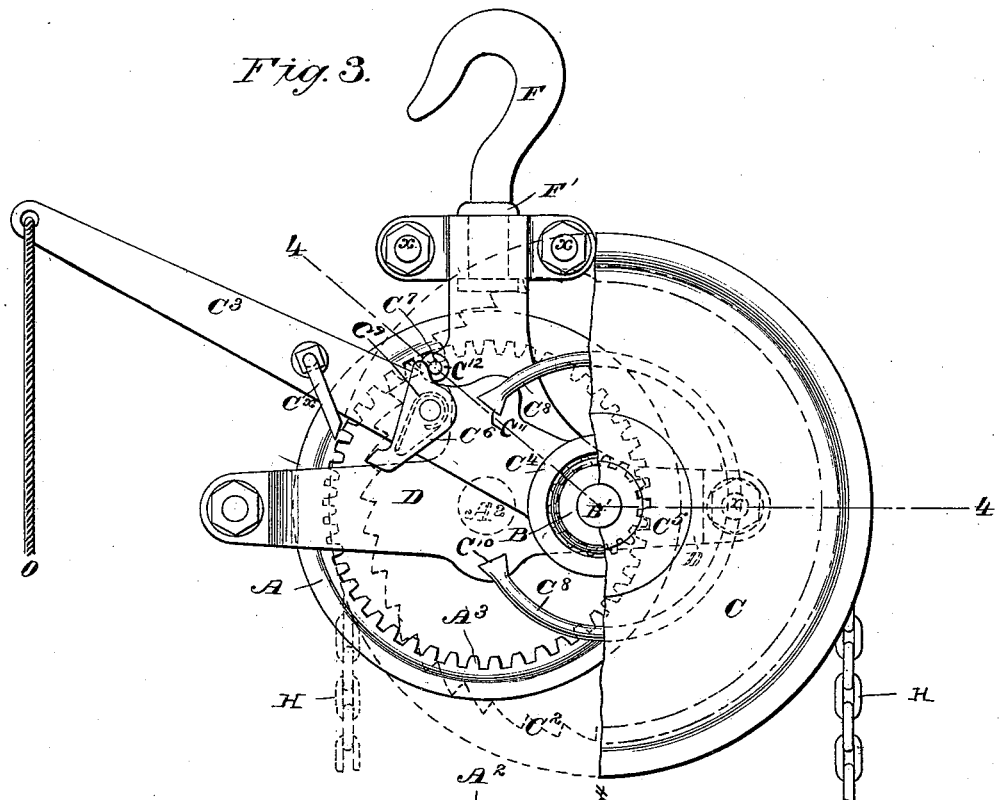
Figure 4:
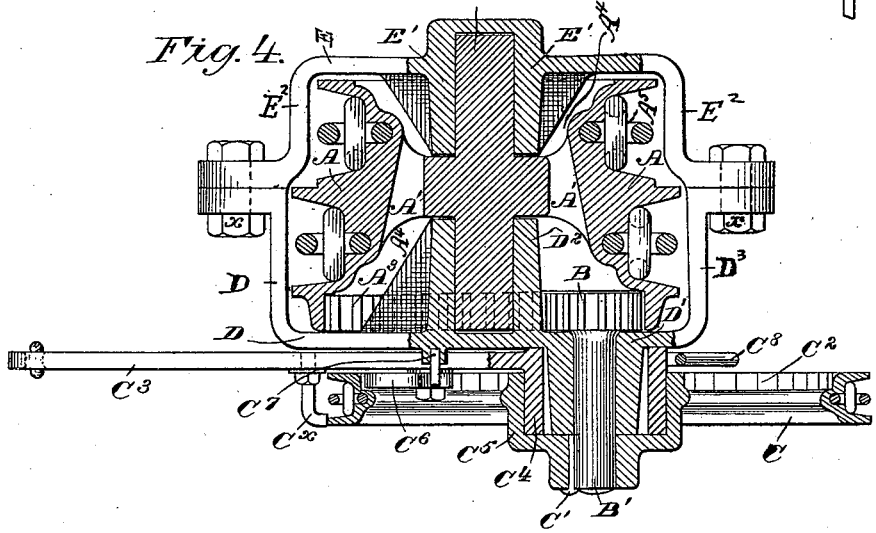

In the accompanying drawings, Figure 1 is a side elevation; Fig. 2, an end elevation, the lower block partly in section. Fig. 3 is a side elevation having the sprocket-wheel partly removed. Fig. 4 is a sectional view in the line 4 4 in Fig. 3.

A is the differential main sheave, having deep recesses $A^4 A^4$ in its sides and a central web or plate or arms, $A'$, in one piece with or secured to its shaft $A^2$, preferably both being cast together of steel.

$A^5$ is the endless lifting-chain.

$A^3$ is an internal annular gear-wheel formed integral with the sheave A.

B is a spur-pinion engaged with the internal annular gear, $A^3$.

C is a driving and sprocket wheel secured, by a key, $C'$, to the shaft $B'$.

$C^2$ is an annulus of internal ratchet-teeth cast upon the inner rim of the driving-wheel C, and forming a ratchet-wheel for the lever $C^3$. The boss or eye $C^4$ of the latter turns within the boss $C^5$ of the wheel C.

$C^6$ is a pawl pivoted to the lever $C^3$ and adapted to engage the ratchet-wheel $C^2$. The pawl $C^6$ is recessed on its side next to the lever in order to contain a spring, $C^9$, the fixed end of which is pinned to the lever $C^3$, the free end pressing the pawl outward toward the ratchet-teeth $C^2$.

$C^8$ is a spring having one end, $C^{10}$, fixed to the frame and the other end, $C^{11}$, fixed to the lever $C^3$. The spring $C^8$ serves to lift the lever $C^3$ upward, which lever $C^3$ comes to rest against a stop, $C^{12}$. At this point the tail of the pawl $C^6$ impinges upon the stop $C^7$, whereby the acting end of the pawl is lifted from its engagement with the ratchet-teeth $C^2$, so that the sprocket-wheel can be freely turned either way without hinderance from the pawl and lever to operate the machine.

$C^\times$ is a chain guard or keeper riveted in the lever $C^3$ to retain the endless hand-chain H upon the sprocket-wheel C.

D is a frame-side provided with an exterior hub, $D'$, in which is formed a bearing for the pinion-shaft B, and with guide-arms $D^3 D^3$, united at their ends with the guide-arms $E^2 E^2$.

$D^2$ is a hub projecting inwardly, within which is a bearing for the main shaft $A^2$.

E is the other frame-side, having an inwardly-projecting hub, $E'$, within which is the other bearing for the main shaft $A^2$.

The sides D E are united by bolts X on each side of the hook-shank $F'$ and at the outer ends of the guide-arms.

G is the lower block, having its frame, like the upper one, in two halves, with the inwardly and outwardly projecting hubs, $G' G^2$, to support the united shaft and sheave $G^3$.

The operation is as follows: The differential action of the differential sheave A upon the lifting-chain and lower or moving block, G, is too well known to need explanation. It may be found, if desired, in the specification of the Weston patent, No. 67,470, before mentioned. It will suffice to say that the sheave A, through its internal annular gear-wheel $A^3$, is rotated by the pinion B, shaft $B'$, driving-sheave C, and its usual hand-chain.

Turned one way the sheave C hoists a load upon the block G, and the other way lowers it. When the operator ceases to turn the sheave C, either in hoisting or lowering the load, it remains suspended, after the manner of Weston's differential pulley-blocks. Should the mechanical purchase thus afforded by the said hand-chain and sheave C be insufficient, an increased purchase is always available for use by means of the lever $C^3$, from which hangs a cord or chain, O. As the operator pulls down the lever, the pawl $C^6$ moves from the stop $C^7$, and is at once carried by its contained spring into contact and engagement with the ratchet-wheel $C^2$. Repeated strokes of the lever impart rotation to the pulley C with the increased mechanical effect due to the greater radius of the lever over that of the pulley C. Upon releasing the cord O the lever at once returns to its upward or normal position, when its pawl is disengaged from the ratchet-teeth by resting against the stop $C^7$. The hand-chain (not shown) upon the pulley C and the cord O therefore afford two speeds of hoisting always available at the instant. Lowering is always effected by reversing the motion of the hand-chain.

It is obvious that my invention as a whole can be embodied in the frame of a fixed hoist or other machine requiring like hoisting and lowering devices.

I am aware that a self-releasing ratchet-lever for operating Weston's differential pulleys is by itself an invention prior in date to this invention, being found in the English patent to T. A. Weston, No. 1,985, of May 19, 1879, Figs. 5 and 6, and in other prior publications. I do not, therefore, claim such self-releasing ratchet-lever, broadly, as my invention.

I am also aware that a rudimentary form of a vertically-divided frame without attached guide-arms has been suggested in my English patent of April 25, 1859, No. 1,033, Figs. 4 and 5, and that in said English patent the differential sheave and shaft are described as being rigidly united, (see Figs. 4 and 5 thereof,) and that inwardly-projecting bearings are by themselves an old device in ordinary rope-blocks. I do not, therefore, claim these last-mentioned features simply or broadly; but What I do claim as my invention in Weston's differential chain-pulleys, is—

1. The combination of a toothed differential chain-pulley with a ratcheted sprocket driving-wheel and a self-releasing ratchet-lever, as and for the purposes set forth.

2. The combination of the double-grooved toothed differential chain-sheave A, provided with deep side recesses, $A^4 A^4$, and secured to or made integral with its shaft $A^2$, the divided frame D E, provided with the guide-arms $D^3 E^2$, and with internal bearings, $D^2 E'$, occupying the recesses $A^4 A^4$ of the sheave A, the hook F, the endless chain $A^5$, and the lower block, G, as and for the purposes set forth.

New York city, November 16, 1887.

THOS. A. WESTON.

Witnesses:
T. NOTTINGHAM WILLIANS,
HENRY E. EVERDING.